(12) United States Patent
Ogawa et al.

(10) Patent No.: US 10,868,410 B2
(45) Date of Patent: Dec. 15, 2020

(54) MOTOR

(71) Applicant: Nidec Corporation, Kyoto (JP)

(72) Inventors: Kosuke Ogawa, Kyoto (JP); Takashi Seguchi, Kyoto (JP); Shunsuke Murakami, Kyoto (JP); Takao Atarashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/478,490

(22) PCT Filed: Jan. 16, 2018

(86) PCT No.: PCT/JP2018/001077
§ 371 (c)(1),
(2) Date: Jul. 17, 2019

(87) PCT Pub. No.: WO2018/155006
PCT Pub. Date: Aug. 30, 2018

(65) Prior Publication Data
US 2019/0341749 A1    Nov. 7, 2019

(30) Foreign Application Priority Data

Feb. 23, 2017    (JP) .................................. 2017-031773

(51) Int. Cl.
*H02K 3/28*        (2006.01)
*H02K 5/22*        (2006.01)
*H02B 1/20*        (2006.01)

(52) U.S. Cl.
CPC ............... *H02B 1/205* (2013.01); *H02K 3/28* (2013.01); *H02K 5/225* (2013.01)

(58) Field of Classification Search
CPC ............... H02K 3/50; H02K 5/24; H02K 1/16
(Continued)

(56) References Cited

U.S. PATENT DOCUMENTS 5,682,070 A * 10/1997 Adachi ................. H02K 19/22
                                                                    310/71
8,106,550 B2 * 1/2012 Muramoto ............. H02K 3/522
                                                                    310/71

(Continued)

FOREIGN PATENT DOCUMENTS

JP    2007-202263 A    8/2007
JP    2013-223295 A    10/2013

OTHER PUBLICATIONS

Official Communication issued in International Patent Application No. PCT/JP2018/001077, dated Mar. 27, 2018.

*Primary Examiner* — Jose A Gonzalez Quinones
(74) *Attorney, Agent, or Firm* — Keating & Bennett (57) ABSTRACT

A motor includes a stator including, a rotor to rotate about a central axis extending in a vertical direction, and a first bus bar, a second bus bar, and a third bus bar to which lead wires of the coils are respectively connected. The first bus bar includes a first connecting portion to which two lead wires are connected, the second bus bar includes a second connecting portion to which two lead wires are connected, the third bus bar includes a third connecting portion to which one lead wire is connected and a fourth connecting portion to which one lead wire is connected. The first and second connecting portions are arranged side by side in a circumferential direction, and the third and fourth connecting portions are arranged in the circumferential direction with the first and second connecting portions interposed therebetween.

6 Claims, 4 Drawing Sheets (58) Field of Classification Search
USPC .......................................... 310/71, 194, 195
See application file for complete search history.

(56) References Cited

U.S. PATENT DOCUMENTS

| | | | |
|---|---|---|---|
| 10,211,699 B2* | 2/2019 | Fukunaga | ............ H01R 25/167 |
| 2009/0127948 A1* | 5/2009 | Shimizu | ................... H02K 3/50 |
| | | | 310/71 |
| 2011/0006625 A1 | 1/2011 | Fujii et al. | |
| 2016/0329772 A1* | 11/2016 | Fukunaga | .............. H02K 5/225 |
| 2017/0310183 A1 | 10/2017 | Jang et al. | |

* cited by examiner

MOTOR

CROSS REFERENCE TO RELATED APPLICATIONS

This is the U.S. national stage of PCT Application No. PCT/JP2018/001077, filed on Jan. 16, 2018, and priority under 35 U.S.C. § 119(a) and 35 U.S.C. § 365(b) is claimed from Japanese Application No. 2017-031773, filed Feb. 23, 2017; the entire disclosures of each application are incorporated herein by reference.

1. FIELD OF THE INVENTION

The present disclosure relates to a motor.

2. BACKGROUND

Conventionally, motors having a plurality of bus bars are known. For example, in a motor of a related art, bus bars for Y-Δ connection of coils of multiple systems are disclosed.

In the conventional motors, at least four bus bars are required for a three-phase circuit of one system in order to perform Y connection. For this reason, in the case in which three-phase circuits of multiple systems are configured, there are problems in that an arrangement of bus bars tends to be complicated, the bus bars overlap in an axial direction thereof, and a dimension of a motor in the axial direction becomes large.

SUMMARY

One example embodiment of the present disclosure provides a motor, which is a three-phase brushless motor including a Δ connection including six or more poles. The motor includes a stator including a plurality of coils, a rotor to rotate about a central axis extending in a vertical direction, and a first bus bar, a second bus bar, and a third bus bar to which lead wires of the coils are connected. The first bus bar includes a first connecting portion to which two lead wires are connected, the second bus bar includes a second connecting portion to which two lead wires are connected, and the third bus bar includes a third connecting portion to which one lead wire is connected and a fourth connecting portion to which one lead wire is connected. The first and second connecting portions are arranged side by side in a circumferential direction, and the third and fourth connecting portions are arranged in the circumferential direction with the first and second connecting portions interposed therebetween.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the accompanying drawings. Further, the scope of the present disclosure is not limited to the following example embodiments and may be arbitrarily changed within the technical scope of the present disclosure. In addition, in the following drawings, an actual structure and a scale and number in each structure may vary in order to make each configuration easy to understand.

Further, in the drawing, an XYZ coordinate system is appropriately represented as a three-dimensional orthogonal coordinate system. In the XYZ coordinate system, a Z-axis direction is a direction parallel to an axial direction of a central axis J shown in FIG. 1. An X-axis direction is a direction orthogonal to the Z-axis direction and represents a lateral direction of FIG. 1. A Y-axis direction is a direction orthogonal to both of the X-axis direction and the Z-axis direction.

Further, in the following description, a positive side (+Z-axis side or one side) in the Z-axis direction is referred to as an "upper side," and a negative side (−Z-axis side or the other side) in the Z-axis direction is referred to as a "lower side." The terms "upper side" and "lower side" are names used for a simple description and do not limit an actual positional relationship or direction. Unless otherwise stated, a direction (the Z-axis direction) parallel to the central axis J is simply referred to as an "axial direction," a radial direction about the central axis J is simply referred to as a "radial direction," and a circumferential direction about the central axis J, that is, a periphery of the axis of the central axis J, is simply referred to as a "circumferential direction." Further, in the following description, "in plan view" refers to a state viewed from the axial direction.

<Motor>

Figure 1:
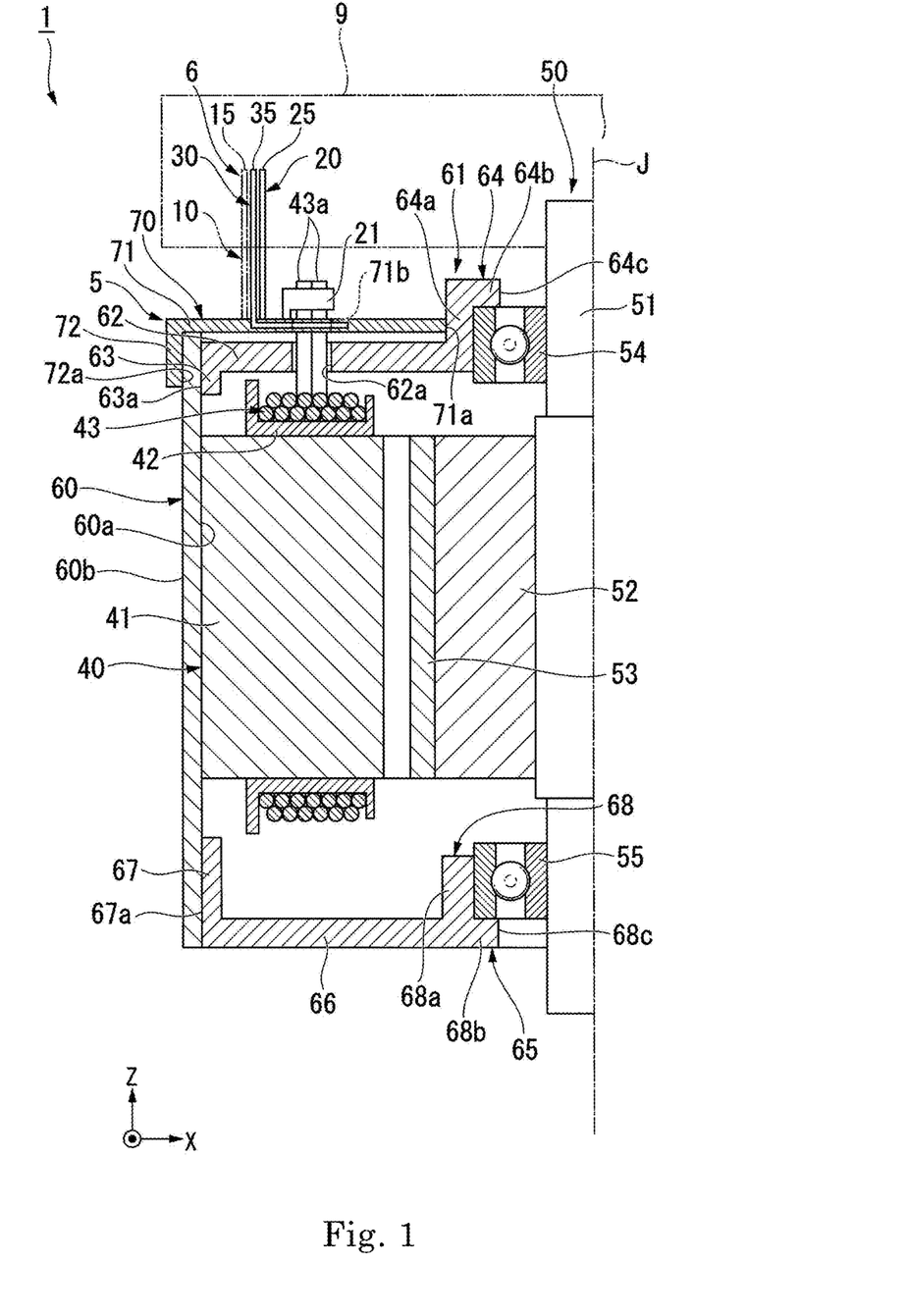
FIG. 1 is a cross-sectional view of a motor according to an example embodiment of the present disclosure.

FIG. 1 is a cross-sectional view of a motor 1 taken along the central axis J.

The motor of the present example embodiment is a three-phase brushless motor having a Δ connection having six or more poles. The motor 1 includes a motor housing 60, a rotor 50 configured to rotate about the central axis J extending in a vertical direction, a stator 40 having a plurality of coils 43, an upper bearing 54, a lower bearing 55, an upper bearing holder 61, a lower bearing holder 65, and a bus bar unit 5. Further, the bus bar unit 5 has a first bus bar 10, a second bus bar 20, and a third bus bar 30. That is, the motor 1 has the first to third bus bars 10, 20, and 30.

[Motor Housing]

The motor housing 60 has a cylindrical shape having the central axis J as a center thereof. The motor housing 60 is opened to an upper side (+Z-axis side) and a lower side (−Z-axis side). The motor housing 60 surrounds the stator 40 from the outside in a radial direction thereof. An upper opening of the motor housing 60 is covered with the upper bearing holder 61. Further, a lower opening of the motor housing 60 is covered with the lower bearing holder 65.

[Rotor]

The rotor 50 has a shaft 51, a rotor core 52, and a rotor magnet 53. The shaft 51 has the central axis J extending in the vertical direction (the Z-axis direction) as a center thereof.

The shaft 51 is rotatably supported around the axis of the central axis J by the lower bearing 55 and the upper bearing 54. An upper end portion of the shaft 51 protrudes to an upper side of the upper bearing holder 61. Similarly, a lower end portion of the shaft 51 protrudes to a lower side of the lower bearing holder 65. For example, a coupler (not shown) for connecting to an output target is press-fitted into the upper or lower end portion of the shaft 51.

The rotor core 52 is fixed to the shaft 51. The rotor core 52 surrounds the shaft 51 in a circumferential direction thereof. The rotor core 52 is positioned between the lower bearing 55 and the upper bearing 54 in the vertical direction.

The rotor magnet 53 is a permanent magnet. The rotor magnet 53 is fixed to an outer side surface of the rotor core 52 in a circumferential direction thereof. The rotor magnet 53 of the present example embodiment has six or more poles. Therefore, in the rotor magnet 53, six or more boundary portions between an N pole and an S pole are arranged in the circumferential direction.

[Upper Bearing and Lower Bearing]

The upper bearing 54 rotatably supports an upper portion of the shaft 51. The upper bearing 54 is positioned at an upper side (+Z-axis side) of the stator 40. The lower bearing 55 rotatably supports a lower portion of the shaft 51. The lower bearing 55 is positioned at a lower side (−Z-axis side) of the stator 40.

In the present example embodiment, the upper bearing 54 and the lower bearing 55 are ball bearings. However, the types of the upper bearing 54 and the lower bearing 55 are not particularly limited, and other types of bearings may be used.

[Upper Bearing Holder]

The upper bearing holder 61 is positioned at the upper side (+Z-axis side) of the stator 40. The upper bearing holder 61 holds the upper bearing 54. The upper bearing holder 61 has an upper bearing support portion 64, a disc portion 62 extending outward in a radial direction thereof from a lower end of the upper bearing support portion 64, and a fitting portion 63 extending downward from an outer side end portion of the disc portion 62.

The upper bearing support portion 64 is positioned at an inner side end portion of the disc portion 62 in the radial direction. The upper bearing support portion 64 has a cylindrical portion 64a, which holds an outer ring of the upper bearing 54 from the outside in a radial direction thereof, and an upper plate portion 64b extending inward in a radial direction thereof from an upper end of the cylindrical portion 64a. A through-hole 64c through which the shaft 51 passes is formed in the upper plate portion 64b.

The disc portion 62 has a circular shape having the central axis J as a center thereof in plan view. A through-hole 62a through which an lead wire 43a, which is drawn out from the coil 43, passes is formed in the disc portion 62.

The fitting portion 63 is a cylinder which is positioned on an outer end portion of the disc portion 62 in a radial direction thereof and extends downward. An outer circumferential surface 63a of the fitting portion 63 is fitted to an inner circumferential surface 60a of the motor housing 60.

[Lower Bearing Holder]

The lower bearing holder 65 is positioned at the lower side (−Z-axis side) of the stator 40. The lower bearing holder 65 holds the lower bearing 55. The lower bearing holder 65 has a lower bearing support portion 68, a disc portion 66 extending outward in a radial direction thereof from the lower bearing support portion 68, and a fitting portion 67 extending upward from an outer side end of the disc portion 66.

The lower bearing support portion 68 has a cylindrical portion 68a, which holds an outer shape of the lower bearing 55 from the outside in a radial direction thereof, and a lower plate portion 68b extending inward in a radial direction thereof from a lower end of the cylindrical portion 68a. A through-hole 68c through which the shaft 51 passes is formed in the lower plate portion 68b.

The disc portion 66 has a circular shape having the central axis J as a center thereof in plan view.

The fitting portion 67 is a cylinder which is positioned on an outer side of the disc portion 62 in a radial direction thereof and extends upward. An outer circumferential surface 67a of the fitting portion 67 is fitted to the inner circumferential surface 60a of the motor housing 60.

[Stator]

The stator 40 surrounds an outer side of the rotor 50 in a radial direction thereof. The stator 40 has a stator core 41, a bobbin 42, and a coil 43. The stator 40 is fixed to the inner circumferential surface 60a of the motor housing 60 on an outer circumferential surface 41a of the stator core 41.

The bobbin 42 is made of an insulating material. The bobbin 42 covers at least a portion of the stator core 41.

The coil 43 is formed by winding a conductive wire around the stator 40 through the bobbin 42. The coil 43 magnetizes the stator core 41 when the motor 1 is driven. An end portion of the conductive wire constituting the coil 43 is drawn out to connection portions of the first to third bus bars 10, 20, and 30 as an lead wire 43a. Since the motor 1 of the present example embodiment is a three-phase brushless motor, the number of coils 43 (i.e., the number of slots) is a multiple of three.

Figure 2:
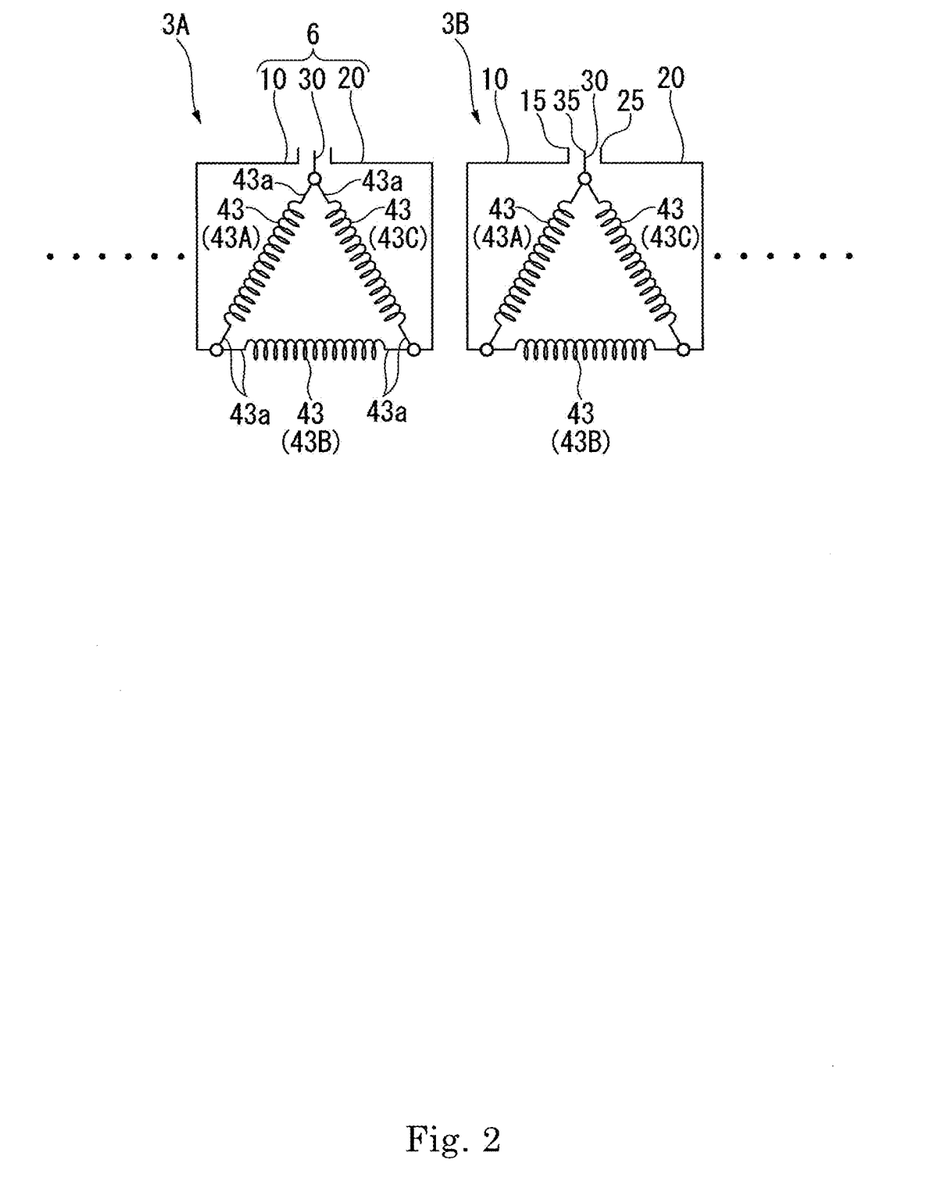
FIG. 2 is a schematic view of three-phase circuits of a motor according to an example embodiment of the present disclosure.

FIG. 2 is a schematic view of a plurality of three-phase circuits 3A, 3B, . . . formed by the plurality of coils 43 of the present example embodiment.

The motor 1 of the present example embodiment has three-phase circuits 3A, 3B, . . . of multiple systems. The three-phase circuits 3A, 3B, . . . of each system are independent three-phase circuits. That is, the three-phase circuits 3A, 3B, . . . of each system are not electrically connected inside the motor 1 at least. Further, in an external device 9 (see FIG. 1) connected to the motor 1, phases (a U-phase, a V-phase, and a W-phase) of the three-phase circuits 3A, 3B, . . . of each system may be electrically connected to each other.

In the present example embodiment, three coils 43 are included in each of the three-phase circuits 3A, 3B, . . . of each system. The three coils 43 included in each of the three-phase circuits 3A, 3B, . . . of each system are connected to each other by the first, second, and third bus bars 10, 20, and 30 to form the Δ connection. In the three-phase circuits 3A, 3B, . . . of each system, three places at which the three coils 43 are connected by the first, second, and third bus bars 10, 20, and 30 correspond to the U-phase, the V-phase, and the W-phase, respectively. The coils 43 included in each of the three-phase circuits 3A, 3B, . . . of each system are arranged side by side in a radial direction thereof for each system of the three-phase circuits to which the coils 43 belong.

[Bus Bar Unit]

As shown in FIG. 1, the bus bar unit 5 is positioned above the upper bearing holder 61. The bus bar unit 5 has a plurality of bus bar sets 6 and a bus bar holder 70 which holds the plurality of bus bar sets 6. Each of the bus bar sets 6 has first to third bus bars 10, 20, and 30. The first to third bus bars 10, 20, and 30 are formed by performing press working on a conductive metal plate.

The bus bar holder 70 is made of a resin material. A portion of the bus bar set 6 is embedded in the bus bar holder 70 and insert-molded. Accordingly, the bus bar holder 70 holds the bus bar set 6. Further, the bus bar set 6 does not necessarily have to be insert-molded as long as the bus bar holder 70 may hold the bus bar set 6.

The bus bar holder 70 has a plate-shaped holder main body portion 71 and a tubular fixing portion 72.

The holder main body portion 71 has a circular shape having the central axis J as a center thereof in plan view. A first through-hole 71a through which the upper bearing support portion 64 passes is formed at a center of the holder main body portion 71. Further, a plurality of second through-holes 71b through which the lead wire 43a of the coil 43 passes is formed in the holder main body portion 71. The lead wire 43a is connected to the first to third bus bars 10, 20, and 30 above the bus bar holder 70. A portion of the bus bar set 6 is embedded in the holder main body portion 71. Therefore, the bus bar holder 70 holds the bus bar set 6 in the holder main body portion 71.

The tubular fixing portion 72 extends downward from an outer end portion of the holder main body portion 71 in a radial direction thereof. An inner circumferential surface 72a of the tubular fixing portion 72 surrounds an outer circumferential surface 60b of the motor housing 60 from an outside thereof in the radial direction. The inner circumferential surface 72a of the tubular fixing portion 72 and the outer circumferential surface 60b of the motor housing 60 are fixed by, for example, an adhesive. Since the tubular fixing portion 72 covers the outer side of the outer circumferential surface 60b of the motor housing 60 in the radial direction, deformation of the motor housing 60 may be suppressed even when the motor housing 60 is deformed outward in the radial direction due to the fixation of the motor housing 60 and the upper bearing holder 61.

Further, a lower surface of the bus bar holder 70 and an upper surface of the upper bearing holder 61 face each other across a gap. Meanwhile, the lower surface of the bus bar holder 70 and an upper portion of the motor housing 60 are in contact with each other. Accordingly, the bus bar holder 70 is positioned based on the motor housing 60 without depending on the dimensional accuracy of the upper bearing holder. Since the motor housing 60 is a member for supporting the stator 40, the positioning accuracy of the stator 40 and the bus bar may be improved.

Figure 3:
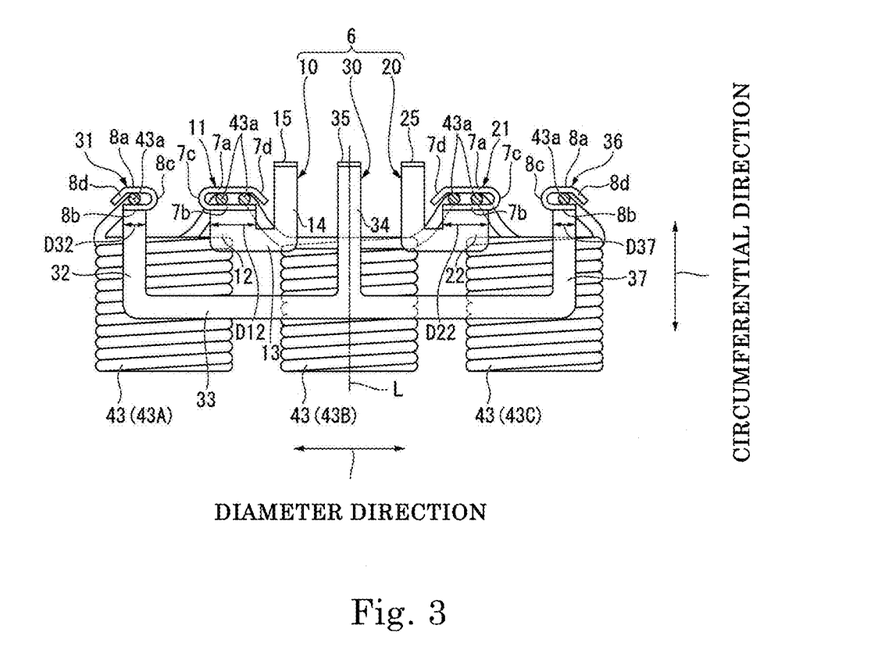
FIG. 3 is a schematic view of a bus bar set and coils connected to a bus bar set in a motor according to an example embodiment of the present disclosure.

FIG. 3 is a schematic view of the bus bar set 6 and the plurality of coils 43 connected to the bus bar set 6 when viewed from above. In FIG. 3, the coils 43 and the bus bars 10, 20, and 30, which are arranged in a circular arc around the central axis J, are shown as being arranged in a straight line for the sake of simplification. Therefore, in FIG. 3, a vertical direction represents the radial direction of the motor 1 and a lateral direction represents the circumferential direction of the motor 1. Further, in FIG. 3, the bus bar holder 70 which holds the bus bar set 6 (i.e., the bus bars 10, 20, and 30) is omitted.

Three coils 43 are arranged below the bus bar set 6. Lead wires 43a drawn out from the three coils 43 positioned directly below the bus bar set 6 are connected to the first, second, and third bus bars 10, 20, and 30 of the bus bar set 6. As shown in FIG. 2, one bus bar set 6 is provided in a three-phase circuit 3A (or a three-phase circuit 3B) of one system. Therefore, the motor 1 has the same number of bus bar sets 6 as the number of systems of the three-phase circuits 3A, 3B, . . . . Since the motor 1 of the present example embodiment has three-phase circuits 3A and 3B of multiple systems, the motor 1 has a plurality of bus bar sets 6.

As shown in FIG. 1, the first, second, and third bus bars 10, 20, and 30 have connection terminals (a first connection terminal 15, a second connection terminal 25, and a third connection terminal 35) for connecting to the external device 9 positioned above the motor 1, respectively. The connection terminals 15, 25, and 35 are inserted into sockets of the external device 9. The motor 1 is driven by an alternating current of a U phase, a V phase, and a W phase applied from the external device 9 to the connection terminals 15, 25, and 35, respectively.

As shown in FIG. 3, the bus bar set 6 is disposed to be bilaterally symmetrical with respect to a reference line L as a center. Here, the reference line L is defined as a straight line which passes through the central axis J and extends in a radial direction thereof in plan view. Further, the first, second, and third bus bars 10, 20, and 30 of the bus bar set 6 are arranged so as not to overlap each other in plan view.

As shown in FIG. 3, the first bus bar 10 has a first connecting portion 11, a first adjacent portion 12, a first main body portion 13, a first main body connecting portion 14, and a first connection terminal (the connection terminal) 15. The respective portions of the first bus bar 10 are arranged in a U shape in plan view, and the first connecting portion 11 and the first connection terminal 15 are positioned at both ends, respectively. A plate thickness direction of the first adjacent portion 12, the first main body portion 13, and the first main body connecting portion 14 coincide with an axial direction. A plate thickness direction of the first connecting portion 11 and the first connection terminal 15 is orthogonal to the axial direction.

The first connecting portion 11 is formed by being bent with respect to the first adjacent portion 12, which is adjacent thereto, in the axial direction. Two lead wires 43a are connected to the first connecting portion 11.

The first adjacent portion 12 is positioned on an inner side of the first connecting portion 11 in a radial direction thereof and connected to the first connecting portion 11. The first adjacent portion 12 extends inward along the radial direction from the first connecting portion 11.

The first main body portion 13 is connected to the first adjacent portion 12. The first main body portion 13 extends in a circumferential direction thereof from the first adjacent portion 12 side toward the reference line L.

The first main body connecting portion 14 is connected to the first main body portion 13. The first main body connecting portion 14 extends outward along a radial direction thereof from the first main body portion 13.

The first connection terminal 15 is connected to an outer end of the first main body connecting portion 14 in the radial direction. The first connection terminal 15 is formed by being bent with respect to the first main body connecting portion 14, which is adjacent thereto, in the axial direction. The first connection terminal 15 extends upward along the axial direction from the main body connecting portion 14.

The second bus bar 20 has a second connecting portion 21 to which two lead wires 43a are connected, a second adjacent portion 22, a second main body portion 23, a second main body connecting portion 24, and a second connection terminal (the connection terminal) 25. The second bus bar 20 has a bilaterally symmetrical shape with the first bus bar 10 in plan view. Therefore, the second connecting portion 21 has a bilaterally symmetrical configuration with the first connecting portion 11, the second adjacent portion 22 has a bilaterally symmetrical configuration with the first adjacent portion 12, the second main body portion 23 has a bilaterally symmetrical configuration with the first main body portion 13, the second main body connecting portion 24 has a bilaterally symmetrical configuration with the first main body connecting portion 14, and the second connection terminal 25 has a bilaterally symmetrical configuration with the first connection terminal 15. Further, although the above components are described to have the bilaterally symmetrical shape, it is not necessary to be strictly bilaterally symmetrical. For example, the left and right configurations may have some differences, such as the positions of the connecting portions being different in the circumferential direction, and the curved portion being disposed on the second arm portion.

The third bus bar 30 has a bilaterally symmetrical shape with respect to the reference line L passing through the central axis J in plan view. The third bus bar 30 has a third connecting portion 31, a third adjacent portion 32, a fourth connecting portion 36, a fourth adjacent portion 37, a third main body portion 33, a third main body connecting portion 34, and a third connection terminal (the connection terminal) 35. A plate thickness direction of the third adjacent portion 32, the fourth adjacent portion 37, the third main body portion 33, and the third main body connecting portion 34 coincides with the axial direction. A plate thickness direction of the third connecting portion 31, the fourth connecting portion 36, and the third connection terminal 35 is orthogonal to the axial direction. Further, although it is described that the plate thickness direction coincides with the axial direction and the plate thickness direction is orthogonal to the axial direction, it is not necessary to strictly coincide or be orthogonal. The above components may be slightly inclined with respect to the axial direction or may be slightly inclined in a direction orthogonal to the axial direction.

The third connecting portion 31 is formed by being bent with respect to the third adjacent portion 32, which is adjacent thereto, in the axial direction. One lead wire 43a is connected to the third connecting portion 31.

The third adjacent portion 32 is positioned on an inner side of the third connecting portion 31 in a radial direction thereof and connected to the third connecting portion 31. The third adjacent portion 32 extends along the radial direction.

The fourth connecting portion 36 has a bilaterally symmetrical configuration with the third connecting portion 31, and the fourth adjacent portion 37 has a bilaterally symmetrical configuration with the third adjacent portion 32. Further, one lead wire 43a is connected to the fourth connecting portion 36. Further, although the above components are described to have the bilaterally symmetrical shape, it is not necessary to be strictly bilaterally symmetrical. For example, the left and right configurations may have some differences, such as the positions of the connecting portions being different in the circumferential direction, and the curved portion being disposed on the second arm portion.

The third main body portion 33 extends along a circumferential direction thereof. Both end portions of the third main body portion 33 are respectively connected to inner end portions of the third adjacent portion 32 and the fourth adjacent portion 37 in a radial direction thereof. The third main body portion 33 electrically connects the third connecting portion 31 to the fourth connecting portion 36 through the third and fourth adjacent portions 32 and 37. The third main body portion 33 is positioned on inner sides of the first bus bar 10 and the second bus bar 20 in the radial direction. The third main body portion 33 connects the lead wires 43a of the coils 43 positioned farthest among the three coils 43 arranged in the circumferential direction without any overlapping of the other bus bars in the axial direction. Accordingly, the bus bar set 6 may perform the Δ connection of the three coils 43 without overlapping the first, second, and third bus bars 10, 20, and 30 in the axial direction.

The third main body connecting portion 34 extends along the reference line L in a radial direction thereof. An inner end portion of the third main body connecting portion 34 in the radial direction is connected to a center of the third main body portion 33 in a longitudinal direction thereof. Further, an outer end of the third main body connecting portion 34 in the radial direction is connected to the third connection terminal 35. The third main body connecting portion 34 is positioned between the first bus bar 10 and the second bus bar 20 in a circumferential direction thereof.

The third connection terminal 35 is connected to an outer end of the third main body connecting portion 34 in a radial direction thereof. The third connection terminal 35 is formed by being bent with respect to the third main body connecting portion 34, which is adjacent thereto, in the axial direction. The third connection terminal 35 extends upward in the axial direction. The third connection terminal 35 is positioned between the first connection terminal 15 and the second connection terminal 25 in a circumferential direction thereof. That is, the first connection terminal 15, the third connection terminal 35, and the second connection terminal 25 are arranged side by side in this order in the circumferential direction.

According to the present example embodiment, the main body connecting portion 34 of the third bus bar 30 is positioned between the first and second bus bars 10 and 20 in the circumferential direction thereof and extends in the radial direction from the third connection terminal 35. Accordingly, the third connection terminal 35 may be disposed between the first and second bus bars 10 and 20 in the circumferential direction. As a result, the first to third connection terminals 15, 25, and 35 may be arranged side by side in the circumferential direction without overlapping of the bus bars in the axial direction. That is, the three connection terminals 15, 25, and 35 are arranged close to each other in the circumferential direction, and thus may be easily connected to the external device 9. In addition, the motor 1 may be miniaturized by reducing the dimension of the motor 1 in the axial direction.

Here, the three coils 43 positioned below the bus bar set 6 are referred to as a first coil 43A, a second coil 43B, and a third coil 43C. The first, second, and third coils 43A, 43B, and 43C are included in a three-phase circuit of one system. The first, second, and third coils 43A, 43B, and 43C are arranged in this order in one direction along the circumferential direction. Further, the third connecting portion 31, the first connecting portion 11, the second connecting portion 21, and the fourth connecting portion 36 are arranged in this order in one direction along the circumferential direction.

One of a pair of lead wires 43a drawn from the first coil 43A is connected to the first connecting portion 11 and the other is connected to the third connecting portion 31.

One of a pair of lead wires 43a drawn from the second coil 43B is connected to the first connecting portion 11 and the other is connected to the second connecting portion 21.

One of a pair of lead wires 43a drawn from the third coil 43C is connected to the second connecting portion 21 and the other is connected to the fourth connecting portion 36.

Two lead wires 43a are connected to the first and second connecting portions 11 and 21. The first and second connecting portions 11 and 21 are arranged side by side in the circumferential direction. Meanwhile, one lead wire 43a is connected to the third and fourth connecting portions 31 and 36. Further, the third and fourth connecting portions 31 and 36 are disposed with the first and second connecting portions 11 and 21 interposed therebetween in the circumferential direction.

The first to fourth connecting portions 11, 21, 31, and 36 are arranged as described above, and thus it is possible to easily perform the Δ connection on the three coils 43 positioned below the bus bar set 6 by a simple bus bar configuration. That is, according to the present example embodiment, the configuration of the bus bar set 6 may be simplified, and thus the motor 1 that is easy to assemble may be constructed.

Further, the first to fourth connecting portions 11, 21, 31, and 36 are arranged as described above, and thus the arrangement of the first to third bus bars 10, 20, and 30 which do not overlap in the axial direction may be easily realized as shown in FIG. 3. As a result, according to the present example embodiment, it is possible to provide the motor 1 which is miniaturized in the axial direction by reducing an axial dimension thereof.

The first connecting portion 11 has a first arm portion 7a, a second arm portion 7b, a connecting portion 7c which connects end portions of the first and second arm portions 7a and 7b, and a curved portion 7d positioned at a front end of the first arm portion 7a. The first arm portion 7a, the second arm portion 7b, the connecting portion 7c, and the curved portion 7d are formed by bending in a direction orthogonal to the axial direction as a plate thickness direction.

The second connecting portion 21 has the same configuration as the first connecting portion 11. The second connecting portion 21 has a first arm portion 7a, a second arm portion 7b, a connecting portion 7c, and a curved portion 7d. The second connecting portion 21 has a bilaterally symmetrical shape with the first connecting portion 11 with respect to the reference line L interposed therebetween.

The first arm portion 7a and the second arm portion 7b extend in a straight line along a circumferential direction thereof. Further, in this specification, the parallel extension of the first arm portion and the second arm portion means that the first arm portion and the second arm portion may extend side by side in substantially the same direction and means that a direction in which the first arm portion extends may not be strictly parallel to a direction in which the second arm portion extends.

The first arm portion 7a and the second arm portion 7b are arranged with two lead wires 43a interposed therebetween while being in contact with the lead wires 43a. The two lead wires 43a are arranged side by side in a direction in which the first arm portion 7a and the second arm portion 7b extend. Therefore, the first arm portion 7a and the second arm portion 7b have a length sufficient to fit the two lead wires 43a. Further, since the curved portion 7d is provided at a front end of the first arm portion 7a, the first arm portion 7a is slightly shorter than the second arm portion 7b.

The connecting portion 7c connects one end portion of the first arm portion 7a in a circumferential direction thereof to one end portion of the second arm portion 7b in a circumferential direction thereof. The connecting portion 7c has a semicircular arc shape which is convex on the other end in the circumferential direction (i.e., an opposite side to the first and second arm portions 7a and 7b).

The curved portion 7d is positioned at the front end (i.e., an opposite end portion to the connecting portion 7c) of the first arm portion 7a. The curved portion 7d is curved in a direction in which the first arm portion 7a extends. The curved portion 7d is directed toward the front end of the first arm portion 7a and thus extends in a direction close to the second arm portion 7b. A distance between the curved portion 7d and the second arm portion 7b is smaller than a diameter of the lead wire 43a in at least a portion thereof. Further, a distance between a front end of the curved portion 7d and the second arm portion 7b is smaller than the diameter of the lead wire 43a. Accordingly, it is possible to suppress the lead wires 43a from being separated from a region surrounded by the first arm portion 7a, the second arm portion 7b, and the connecting portion 7c.

The third and fourth connecting portions 31 and 36 have the same configuration as the first and second connecting portions 11 and 21 except that the lengths of the arm portions are different as will be described below.

Each of the third and fourth connecting portions 31 and 36 has a first arm portion 8a, a second arm portion 8b, a connecting portion 8c, and a curved portion 8d. The third connecting portion 31 and the fourth connecting portion 36 have a bilaterally symmetrical shape with respect to the reference line L interposed therebetween. Therefore, the opening direction of the third connecting portion 31 and the fourth connecting portion 36 is mutually reversed in left and right directions. Further, although the above components are described to have the bilaterally symmetrical shape, it is not necessary to be strictly bilaterally symmetrical. For example, there may be some differences, such as the positions of the connecting portions being different in the circumferential direction, and the curved portion being disposed on the second arm portion.

The connecting portion 8c and the curved portion 8d of the third and fourth connecting portions 31 and 36 have substantially the same structure as the connecting portion 8c and the curved portion 8d of the first and second connecting portions 11 and 21. That is, the connecting portion 8c connects an end portion of the first arm portion 8a in the circumferential direction to an end portion of the second arm portion 8b in the circumferential direction. Further, the curved portion 8d is positioned at a front end of the first arm portion 8a. The curved portion 8d is directed toward the front end of the first arm portion 8a and thus extends in a direction close to the second arm portion 8b. The curved portion 8d suppresses the lead wires 43a from being separated from a region surrounded by the first arm portion 8a, the second arm portion, and the connecting portion 8c.

The first arm portion 8a and the second arm portion 8b extend in a straight line along the circumferential direction. The first arm portion 8a and the second arm portion 8b are arranged with one lead wire 43a interposed therebetween while being in contact with the lead wire 43a. The first arm portion 8a and the second arm portion 8b may have a length sufficient to fit one lead wire 43a.

One pair of arm portions 7a and 7b of the first and second connecting portions 11 and 21 are longer than one pair of arm portions 8a and 8b of the third and fourth connecting portions 31 and 36. The first and second connecting portions 11 and 21 are connected to two lead wires 43a, whereas the third and fourth connecting portions 31 and 36 are connected to one lead wire 43a. When the lengths of the arm portions are set to be constant regardless of the number of the lead wires to be connected, the arm portions are arranged with the lead wires interposed therebetween by the excessively long arm portion and the connection between the arm portions and the lead wires may become unstable. The stable connection may be secured by setting the arm portions of each of the connection portions to the length corresponding to the number of lead wires 43a to be connected. According to the present example embodiment, since an appearance of the arm portion may be changed according to the number of the lead wires 43a connected to each of the connection portions, it is possible to suppress the wrong number of lead wires 43a from being connected to each of the connection portions during an assembly process.

The first to fourth connecting portions 11, 21, 31, and 36 and the lead wires 43a are fixed to each other by, for example, welding, and are electrically connected. Specifically, in a state in which the lead wires 43a are nipped in a circumferential direction thereof by the first arm portions 7a and 8a and the second arm portions 7b and 8b, the first to fourth connecting portions 11, 21, 31, and 36 and the lead wires 43a are fixed by fitting and resistance welding the first arm portions 7a and 8a and the lead wires 43a and the second arm portions 7b and 8b in the circumferential direction at two electrodes. However, the fixation of the first to fourth connecting portions 11, 21, 31, and 36 and the lead wires 43a is not limited to the fixation by resistance welding. For example, the first to fourth connecting portions 11, 21, 31 and 36, and the lead wires 43a may be fixed by welding other than the resistance welding, such as arc welding, plastic deformation such as caulking, soldering, or adhesion with a conductive adhesive.

A width D12 of the first adjacent portion 12 in the circumferential direction is greater than a width D32 of the third adjacent portion 32 in the circumferential direction and a width D37 of the fourth adjacent portion 37 in the circumferential direction. Similarly, a width D22 of the second adjacent portion 22 in the circumferential direction is greater than the width D32 of the third adjacent portion 32 in the circumferential direction and the width D37 of the fourth adjacent portion 37 in the circumferential direction. Further, in the present example embodiment, the width D12 of the first adjacent portion 12 is the same as the width D22 of the second adjacent portion 22. Further, the width D32 of the third adjacent portion 32 is the same as the width D37 of the fourth adjacent portion 37.

The first and second adjacent portions 12 and 22 are connected to one (the first arm portion 7a) of the pair of arm portions 7a and 7b which are arranged with two lead wires 43a interposed therebetween. Further, the third and fourth adjacent portions 32 and 37 are connected to one (the first arm portion 8a) of the pair of arm portions 8a and 8b which are arranged with one lead wire 43a interposed therebetween. Each of the arm portions is formed by being bent in the axial direction from the adjacent portion. Therefore, in the present example embodiment, a width of each of the adjacent portions is the same as the length of each of the first arm portions 7a and 8a which are adjacent thereto.

According to the present example embodiment, the widths D32 and D37 of the third and fourth adjacent portions 32 and 37 are smaller than the widths D12 and D22 of the first and second adjacent portions 12 and 22. As the first and second adjacent portions 12 and 22 have a wide width in the circumferential direction, two lead wires 43a may be reliably supported by the first and second connecting portions 11 and 21. Meanwhile, since the third and fourth adjacent portions 32 and 37 have one lead wire 43a connected at the third and fourth connecting portions 31 and 36 which are adjacent thereto, reliable support is possible even when the width in the circumferential direction is narrow. The widths D32 and D37 of the third and fourth adjacent portions 32 and 37 are reduced to be relatively small so that a degree of freedom in the arrangement of the bus bars along the circumferential direction may be increased. Further, it is possible to suppress the usage amount of the materials related to the third and fourth adjacent portions 32 and 37 and to provide a lightweight motor 1. Further, since two lead wires are connected to the third and fourth adjacent portions 32 and 37, a current flowing in the third and fourth adjacent portions may also be twice as large as that in the first and second adjacent portions. Since the widths of the third and fourth adjacent portions 32 and 37 are increased, a resistance value may be reduced and heat generation may be suppressed.

According to the present example embodiment described above, a plurality of three-phase circuits 3A, 3B, . . . having the Δ connection may be composed by the plurality of bus bar sets 6. Further, according to the arrangement of the first to third bus bars 10, 20, and 30 of the present example embodiment, it is possible to provide the motor 1 that is miniaturized in the axial direction without overlapping the bus bars in the axial direction.

Here, one three-phase circuit of one system among the three-phase circuits 3A, 3B, . . . of multiple systems has been described with reference to FIG. 3. However, in the present example embodiment, the bus bar set 6 and the plurality of coils 43 constituting the three-phase circuits having the Δ connection by the bus bar set 6 are arranged side by side in the circumferential direction. The number of systems of the three-phase circuits included in the motor 1 is appropriately set according to the performance required in the motor 1.

Further, in the above-described example embodiment, the bus bar unit 5 is shown as being positioned above the upper bearing holder 61. However, the bus bar unit 5 may be positioned below the upper bearing holder 61. In this case, a through-hole through which the first to third connection terminals 15, 25, and 35 pass is formed in the upper bearing holder 61.

Further, in the above-described example embodiment, any one of the upper bearing holder 61 and the lower bearing holder 65 may be a portion of the motor housing 60. That is, the motor housing 60 may have a tubular shape with a bottom having the upper bearing holder 61 or the lower bearing holder 65.

Further, in the above-described example embodiment, three coils 43 are shown as being connected to each of the three-phase circuits 3A, 3B, . . . of each system. However, the plurality of coils 43 may be connected in series to each phase of the three-phase circuits 3A, 3B, . . . .

<Electric Power Steering Apparatus>

Figure 4:
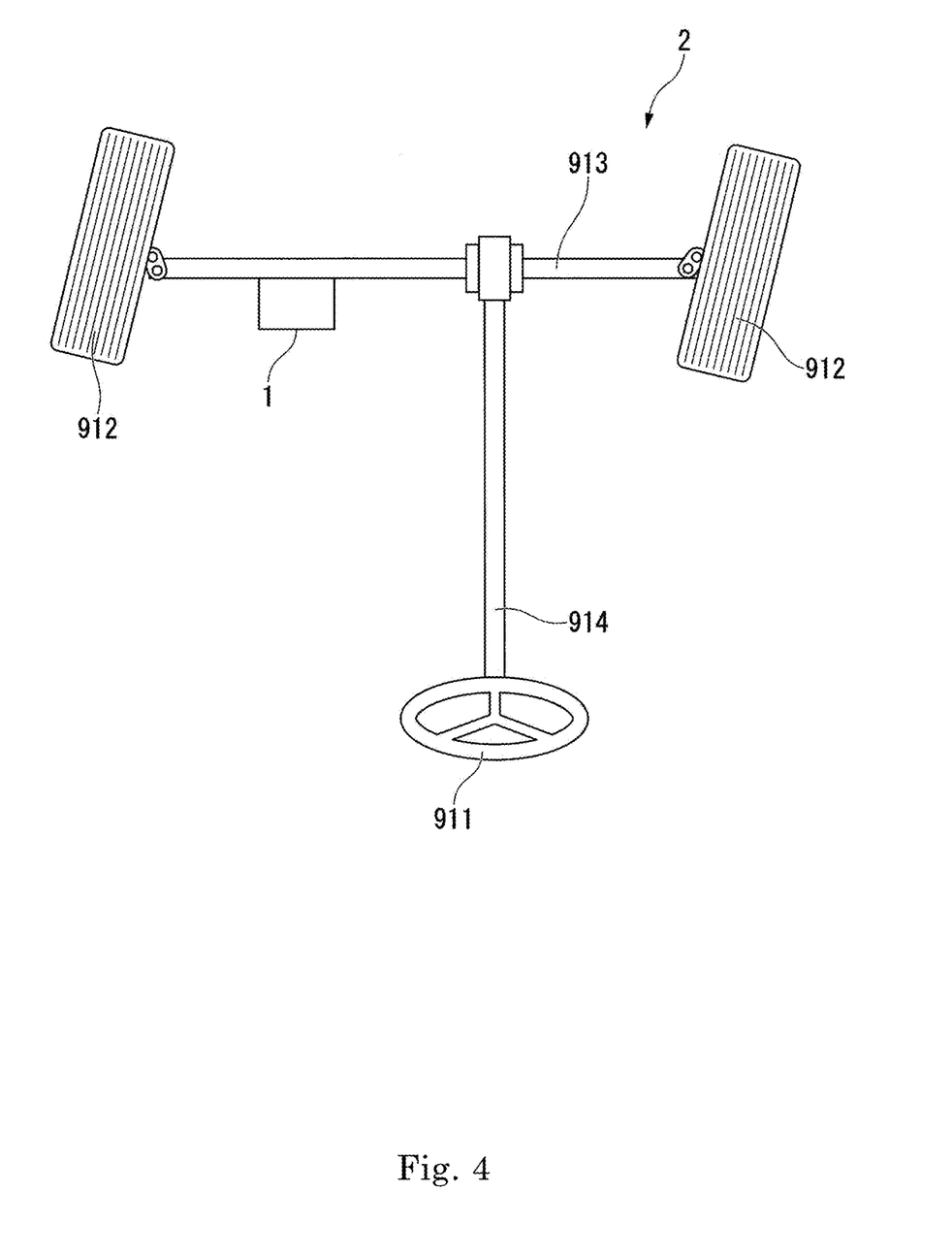
FIG. 4 is a schematic view showing an electric power steering apparatus including a motor according to an example embodiment of the present disclosure.

Next, an example embodiment of an apparatus in which the motor 1 of the present example embodiment is mounted will be described. In the present example embodiment, an example in which the motor 1 is mounted in an electric power steering apparatus will be described. FIG. 4 is a schematic view showing an electric power steering apparatus 2 of the present example embodiment.

<<Electric Power Steering Apparatus>>

Next, an example embodiment of an apparatus in which the motor 1 of the present example embodiment is mounted will be described. In the present example embodiment, an example in which the motor 1 is mounted in an electric power steering apparatus will be described. FIG. 4 is a schematic view showing an electric power steering apparatus 2 of the present example embodiment.

The electric power steering apparatus 2 is mounted on a steering mechanism of a wheel of an automobile. The electric power steering apparatus 2 of the present example embodiment is a rack-type power steering apparatus that serves to directly reduce a steering force by the power of the motor 1. The electric power steering apparatus 2 includes the motor 1, a steering shaft 914, and an axle 913.

The steering shaft 914 transmits an input from the steering 911 to the axle 913 having a wheel 912. The power of the motor 1 is transmitted to the axle 913 through a ball screw (not shown). Since the motor 1 employed in the rack-type power steering apparatus 2 is attached to the axle 913 and is exposed to the outside, a waterproof structure is required.

The electric power steering apparatus 2 of the present example embodiment includes the motor 1 of the present example embodiment. For this reason, the electric power steering apparatus 2 having the same effect as the present example embodiment is obtained.

Further, here, the power steering apparatus 2 is described as an example of a method of using the motor 1 of the present example embodiment, but the method of using the motor 1 is not limited thereto.

According to one aspect of the present disclosure, it is provided a motor in which overlapping of bus bars in an axial direction thereof is suppressed so that the motor is miniaturized in the axial direction.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor, which is a three-phase brushless motor including a Δ connection including six or more poles, the motor comprising:
   a stator including a plurality of coils;
   a rotor to rotate about a central axis extending in a vertical direction; and
   a first bus bar, a second bus bar, and a third bus bar to which lead wires of the coils are respectively connected; wherein
   the first bus bar includes a first connecting portion to which two lead wires are connected;
   the second bus bar includes a second connecting portion to which two lead wires are connected;
   the third bus bar includes a third connecting portion to which one lead wire is connected and a fourth connecting portion to which one lead wire is connected;
   the first and second connecting portions are arranged side by side in a circumferential direction; and
   the third and fourth connecting portions are arranged in the circumferential direction with the first and second connecting portions interposed therebetween.

2. The motor of claim 1, wherein
   each of the first, second, third, and fourth connecting portions includes one pair of arm portions extending in parallel with each other with an lead wire interposed therebetween and a connecting portion that connects end portions of the pair of arm portions; and
   the arm portions of the first and second connecting portions are longer than the arm portions of the third and fourth connecting portion.

3. The motor of claim 1, wherein
   the first bus bar includes a first adjacent portion connected to the first connecting portion and extending in a radial direction;
   the third bus bar includes a third adjacent portion connected to the third connecting portion and extending in a radial direction, and a fourth adjacent portion connected to the fourth connecting portion and extending in a radial direction; and
   a width of the first adjacent portion in the circumferential direction is greater than widths of the third and fourth adjacent portions in the circumferential direction.

4. The motor of claim 1, wherein
   the second bus bar includes a second adjacent portion connected to the second connecting portion and extending in a radial direction;
   the third bus bar includes the third adjacent portion connected to the third connecting portion and extending in the radial direction, and the fourth adjacent portion connected to the fourth connecting portion and extending in the radial direction; and
   a width of the second adjacent portion in the circumferential direction is greater than widths of the third and fourth adjacent portions in the circumferential direction.

5. The motor of claim 1, wherein
   each of the first, second, and third bus bars includes a connection terminal to connect to an external device; and
   the third bus bar includes a main body connecting portion positioned between the first and second bus bars and extending in a radial direction from the connection terminal.

6. The motor of claim 1, further comprising a plurality of bus bar sets including the first, second, and third bus bars.

* * * * *